United States Patent
Gray

(10) Patent No.: US 10,347,239 B2
(45) Date of Patent: Jul. 9, 2019

(54) RECOGNIZING ACCENTED SPEECH

(71) Applicant: Google Technology Holdings LLC, Mountainview, CA (US)

(72) Inventor: Kristin A. Gray, San Mateo, CA (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

(21) Appl. No.: 15/465,345

(22) Filed: Mar. 21, 2017

(65) Prior Publication Data

US 2017/0193990 A1   Jul. 6, 2017

Related U.S. Application Data

(63) Continuation of application No. 15/464,668, filed on Mar. 21, 2017, which is a continuation of application No. 13/772,373, filed on Feb. 21, 2013, now Pat. No. 9,734,819.

(51) Int. Cl.
| | |
|---|---|
| G10L 15/00 | (2013.01) |
| G10L 15/26 | (2006.01) |
| G10L 15/187 | (2013.01) |
| G10L 15/01 | (2013.01) |
| G10L 15/06 | (2013.01) |
| G10L 15/22 | (2006.01) |
| G10L 15/30 | (2013.01) |
| G06F 17/24 | (2006.01) |

(52) U.S. Cl.
CPC .......... *G10L 15/00* (2013.01); *G06F 17/243* (2013.01); *G10L 15/01* (2013.01); *G10L 15/063* (2013.01); *G10L 15/187* (2013.01); *G10L 15/22* (2013.01); *G10L 15/30* (2013.01); *G10L 2015/0635* (2013.01)

(58) Field of Classification Search
None
See application file for complete search history.

(56) References Cited

U.S. PATENT DOCUMENTS

| | | |
|---|---|---|
| 5,897,616 A | 4/1999 | Kanevsky |
| 6,182,039 B1 | 1/2001 | Rigazio |
| 6,249,763 B1 | 6/2001 | Minematus |
| 6,459,910 B1 | 10/2002 | Jouston |

(Continued)

FOREIGN PATENT DOCUMENTS

| | | |
|---|---|---|
| CN | 1558656 A | 12/2004 |
| CN | 1643491 A | 7/2005 |

(Continued)

OTHER PUBLICATIONS

Office action issued in European Application No. 14705615.4, dated Mar. 21, 2018, 6 pages.

(Continued)

*Primary Examiner* — Kevin Ky
(74) *Attorney, Agent, or Firm* — Fish & Richardson P.C.

(57) ABSTRACT

Techniques (300, 400, 500) and apparatuses (100, 200, 700) for recognizing accented speech are described. In some embodiments, an accent module recognizes accented speech using an accent library based on device data, uses different speech recognition correction levels based on an application field into which recognized words are set to be provided, or updates an accent library based on corrections made to incorrectly recognized speech.

21 Claims, 7 Drawing Sheets

(56) References Cited

U.S. PATENT DOCUMENTS

| | | |
|---|---|---|
| 6,665,644 B1 | 12/2003 | Kanevsky et al. |
| 6,714,911 B2 | 3/2004 | Waryas et al. |
| 6,778,959 B1 | 8/2004 | Wu et al. |
| 6,839,670 B1 | 1/2005 | Stammler et al. |
| 6,876,966 B1 | 4/2005 | Deng et al. |
| 6,898,567 B2 | 5/2005 | Balasuriya |
| 6,950,796 B2 | 9/2005 | Ma et al. |
| 6,959,276 B2 | 10/2005 | Droppo et al. |
| 7,155,391 B2 | 12/2006 | Taylor |
| 7,257,532 B2 | 8/2007 | Toyama |
| 7,369,998 B2 | 5/2008 | Sarich et al. |
| 7,392,188 B2 | 6/2008 | Junkawitsch et al. |
| 7,424,426 B2 | 9/2008 | Furui et al. |
| 7,451,085 B2 | 11/2008 | Rose et al. |
| 7,941,189 B2 | 5/2011 | Miyauchi |
| 7,953,219 B2 | 5/2011 | Freedman et al. |
| 7,958,443 B2 | 6/2011 | Rosen |
| 7,996,220 B2 | 8/2011 | Rose et al. |
| 8,041,555 B2 | 10/2011 | Buccella |
| 8,156,114 B2 | 4/2012 | Byers |
| 8,195,460 B2 | 6/2012 | Degani et al. |
| 8,204,884 B2 | 6/2012 | Freedman et al. |
| 8,265,928 B2 | 9/2012 | Kristjansson et al. |
| 8,417,530 B1 | 4/2013 | Hayes |
| 8,548,807 B2 | 10/2013 | Ljolje et al. |
| 2002/0120451 A1 | 8/2002 | Kato |
| 2003/0191639 A1 | 10/2003 | Mazza |
| 2003/0236099 A1 | 12/2003 | Deisher |
| 2004/0006474 A1 | 1/2004 | Gong |
| 2004/0013882 A1 | 7/2004 | Miyazawa |
| 2004/0148161 A1 | 7/2004 | Das |
| 2004/0158457 A1 | 8/2004 | Veprek et al. |
| 2004/0230420 A1 | 11/2004 | Kadambe et al. |
| 2005/0187763 A1 | 8/2005 | Arun |
| 2005/0203729 A1 | 9/2005 | Roth |
| 2005/0216273 A1 | 9/2005 | Reding et al. |
| 2007/0136266 A1 | 6/2007 | Su et al. |
| 2007/0156403 A1 | 7/2007 | Coifman |
| 2007/0208570 A1 | 9/2007 | Bhardwaj et al. |
| 2007/0233487 A1 | 10/2007 | Cohen et al. |
| 2008/0027723 A1 | 1/2008 | Reding et al. |
| 2008/0091435 A1 | 4/2008 | Strope et al. |
| 2008/0091443 A1 | 4/2008 | Strope et al. |
| 2008/0188271 A1 | 8/2008 | Miyauchi |
| 2008/0221887 A1 | 9/2008 | Rose et al. |
| 2008/0221902 A1 | 9/2008 | Cerra et al. |
| 2008/0290987 A1 | 11/2008 | Li |
| 2009/0030687 A1 | 1/2009 | Cerra |
| 2009/0164446 A1 | 6/2009 | Holt et al. |
| 2009/0164929 A1 | 6/2009 | Chen et al. |
| 2009/0192798 A1 | 7/2009 | Basson |
| 2009/0198487 A1 | 8/2009 | Wong et al. |
| 2009/0204243 A1 | 8/2009 | Marwaha et al. |
| 2009/0271188 A1 | 10/2009 | Agapi et al. |
| 2009/0326939 A1* | 12/2009 | Toner .................. H04M 1/656 704/235 |
| 2010/0082329 A1 | 4/2010 | Silverman et al. |
| 2010/0082658 A1 | 4/2010 | Athsani et al. |
| 2011/0035219 A1 | 2/2011 | Kadirkamanathan et al. |
| 2011/0054894 A1 | 3/2011 | Phillips et al. |
| 2011/0106527 A1 | 5/2011 | Chiu |
| 2011/0137653 A1 | 6/2011 | Ljolje et al. |
| 2011/0144973 A1 | 6/2011 | Bocchieri et al. |
| 2011/0161075 A1 | 6/2011 | Hon-Anderson |
| 2011/0313767 A1 | 12/2011 | Duffield |
| 2012/0130712 A1 | 5/2012 | Shin et al. |
| 2012/0216134 A1 | 8/2012 | Neubacher |
| 2012/0222132 A1* | 8/2012 | Burger .................. G06F 21/604 726/28 |
| 2012/0323574 A1* | 12/2012 | Wang ...................... G10L 15/22 704/246 |

FOREIGN PATENT DOCUMENTS

| | | |
|---|---|---|
| CN | 1647023 A | 7/2005 |
| CN | 1659624 A | 8/2005 |
| CN | 101681484 A | 3/2010 |
| CN | 102047323 A | 5/2011 |
| GB | 2 323 694 | 9/1998 |

OTHER PUBLICATIONS

Office Action issued in U.S. Appl. No. 13/771,373 dated Jun. 11, 2015, 12 pages.

Office Action issued in U.S. Appl. No. 13/771,373 dated Dec. 10, 2015, 12 pages.

Office Action issued in U.S. Appl. No. 13/771,373 dated Jun. 16, 2016, 13 pages.

Office Action issued in U.S. Appl. No. 13/771,373 dated Dec. 16, 2016, 14 pages.

Office Action issued in U.S. Appl. No. 13/771,373 dated May 16, 2017, 12 pages.

Nuance Recognizer, White Paper, Bringing New Levels of Accuracy, Reliability, and Ease of Use to Speech-Based Self-Service Applications, 2007, Nuance Communications, Inc., pp. 1-8.

SFX, SPEECHFX, http://www.speechfxinc.com/, downloaded from internet: Oct. 9, 2012, p. 1.

International Search Report and Written Opinion in International Application No. PCT/US2014/012922, dated May 30, 2014, 10 pages.

Bocchieri et al., "Use of geographical meta-data in ASR language and acoustic models", Acoustics Speech and Signal Processing (ICASSP), 2010 IEEE International Conference on IEEE, Mar. 14, 2010, pp. 5118-5121.

International Search Report from related PCT Application No. PCT/US2011/037558, dated Jul. 29, 2011, 17 pages.

International Search Report and Written Opinion for International Application No. PCT/US2011/029407, dated Jun. 7, 2011, 10 pages.

Honda, Masashi, Authorized Officer, The International Bureau of WIPO, Application No. PCT/US2011/037558, in International Preliminary Report on Patentability dated Dec. 6, 2012, 6 pages.

Examination Report in Australian Application No. 2011258531, dated Dec. 17, 2013, 4 pages.

Chinese Office Action issued in Chinese Application No. 201180021722.X dated Jan. 9, 2014, 10 pages (with English translation).

Tao Chen et al., "Automatic Accent Identification Using Gaussian Mixture Models," Microsoft Research China, Department of Automation, Tsinghua University, 4 pages (2001).

Keikichi Hirose et al., "Accent Type Recognition and Syntactic Boundary Detection of Japanese Using Statistical Modeling of Moraic Transitions of Fundamental Frequency Contours," Dept. of Information and Communication Engineering, School of Engineering, University of Tokyo, 4 pages (1998).

Office Action issued in U.S. Appl. No. 12/860,069 dated Sep. 4, 2012, 19 pages.

Notice of Allowance issued in U.S. Appl. No. 12/860,069 dated Dec. 10, 2012, 13 pages.

Office Action issued in U.S. Appl. No. 13/857,629 dated May 15, 2014, 27 pages.

Office Action issued in U.S. Appl. No. 13/772,373 dated Dec. 4, 2014, 23 pages.

International Preliminary Report on Patentability for International Application No. PCT/US2014/012922, dated Sep. 3, 2015, 7 pages.

Office Action issued in U.S. Appl. No. 15/464,668, dated May 14, 2018, 21 pages.

Chinese Office Action issued in Chinese Application No. 201480013019.8, dated Aug. 28, 2018, 7 pages (with English translation).

Notice of Allowance issued in U.S. Appl. No. 15/464,668, dated Nov. 8, 2018, 8 pages.

CN Office Action issued in Chinese Application No. 201480013019.8, dated Feb. 28, 2019, 18 pages (with English translation).

* cited by examiner

400

Receive, from a Remote Computing Device, a Correction to a Speech Element Incorrectly Recognized Using an Accent Library
402

Alter the Accent Library to Provide an Updated Accent Library
404

Provide the Updated Accent Library to Enable a Device to More-Accurately Recognize the Speech Element
406

FIG. 4

RECOGNIZING ACCENTED SPEECH

RELATED APPLICATIONS

This application is a continuation of U.S. application Ser. No. 15/464,668, filed on Mar. 21, 2017, which is a continuation of U.S. application Ser. No. 13/772,373, filed on Feb. 21, 2013, the contents of both are incorporated herein by reference in their entirety.

BACKGROUND

Current speech-recognition technologies are quite poor at recognizing speech when spoken with an accent. To address this problem, one partial solution tracks corrections made by a user in response to a current technology's failure to correctly recognize a word. This partial solution can be frustrating to users with accents, as they often have to correct many incorrectly recognized words before these current technologies improve their recognition, often so many times that a user gives up on voice recognition entirely. Even for those users that take the time and endure the frustration, many current technologies still inadequately recognize a user's speech when that user has an accent.

Another partial solution to address this problem requires a user to go to a special user interface and speak a list of particular words. Requiring users with accents to find this special user interface and speak a list of words does not provide an excellent user experience, and thus often will simply not be performed by users. Further, requiring this effort from users does not enable current technologies to recognize accents sufficiently well. Further still, even if a user that owns a device goes to this effort, it is unlikely to be performed by another user borrowing the owner's device, such as when a device's owner is driving and a passenger uses the owner's device.

BRIEF DESCRIPTION OF THE DRAWINGS

Techniques and apparatuses for recognizing accented speech are described with reference to the following drawings. The same numbers are used throughout the drawings to reference like features and components:

FIG. 4 illustrates example methods for altering an accent library to more-accurately recognize accented speech.

DETAILED DESCRIPTION

Current techniques for recognizing accented speech often are quite poor at recognizing speech when spoken with an accent. This disclosure describes techniques and apparatuses for recognizing accented speech using an accent library, and, in some embodiments, using different speech recognition correction levels based on an application field into which recognized words are set to be provided.

The following discussion first describes an operating environment, followed by techniques that may be employed in this environment, an example application having application fields, and proceeds with example apparatuses.

Figure 1:
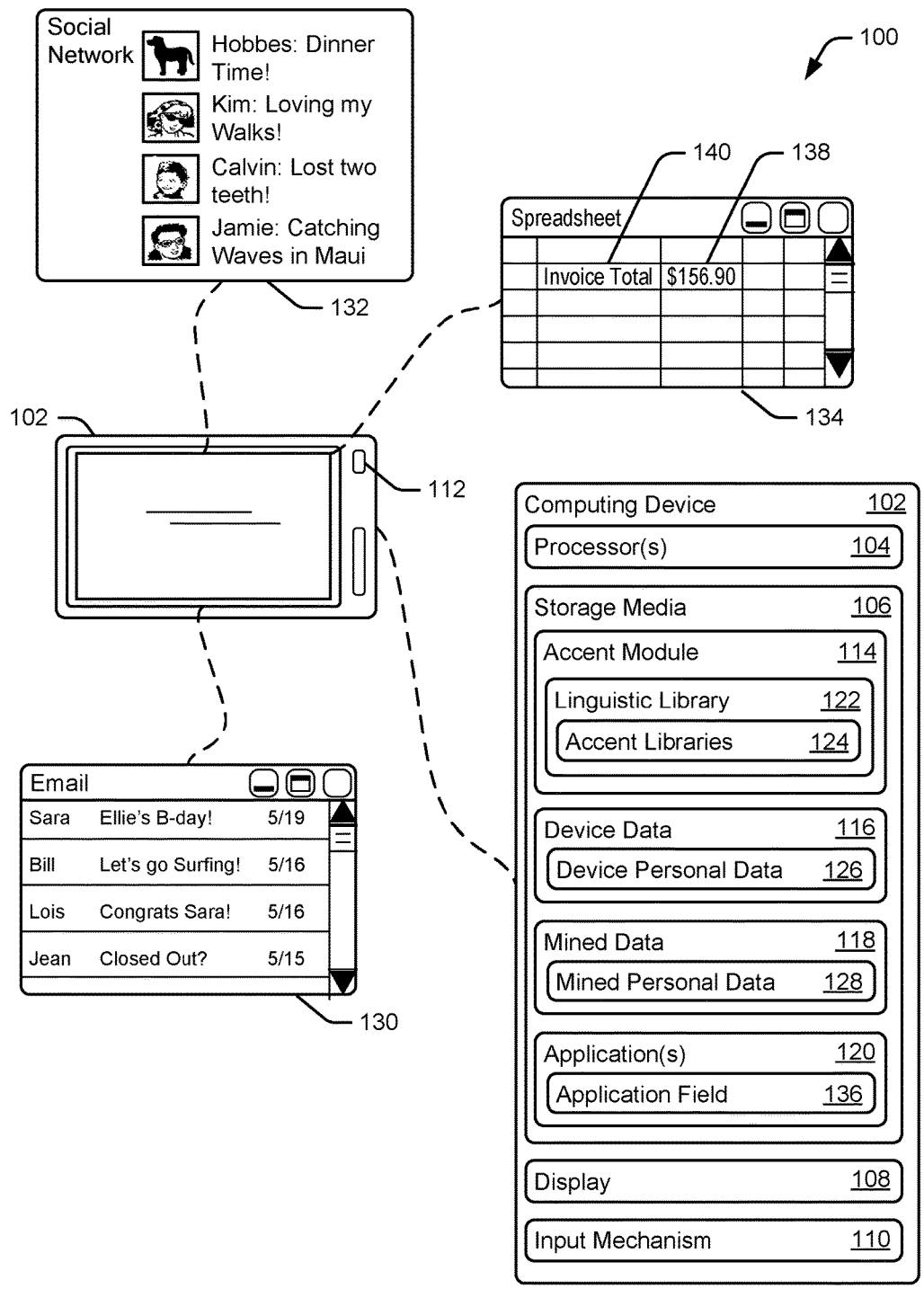
FIG. 1 illustrates an example environment in which techniques for recognizing accented speech can be implemented.

FIG. 1 illustrates an example environment 100 in which techniques for recognizing accented speech can be implemented. Example environment 100 includes a computing device 102 having one or more processors 104, computer-readable storage media (storage media) 106, a display 108, and an input mechanism 110.

Computing device 102 is shown as a smart phone having an integrated microphone 112 as one example of input mechanism 110. Various types of computing devices and input mechanisms may be used, however, such as a personal computer having a separate, standalone microphone, a cellular phone connected to a pico-net (e.g., Bluetooth™) headset having a microphone, or tablet and laptop computers with an integrated stereo microphone, to name but a few.

Computer-readable storage media 106 includes an accent module 114, device data 116, mined data 118, and applications 120. Accent module 114 includes a linguistic library 122 and one or more accent libraries 124. Accent module 114 may operate with, operate without, include, be integral with, and/or supplement a speech recognition engine (not shown). Accent module 114 is capable of recognizing accented speech, such as by determining, based on device data 116, an accent library of accent libraries 124 to use to recognize speech in conjunction with linguistic library 122.

Linguistic library 122 is associated with a language or dialect thereof, such as Australian English, American (US) English, British (King's) English, and so forth. Linguistic library 122 and a known speech recognition engine may operate to perform known speech recognition, though use of either or both is not required. Thus, accent module 114, in some embodiments, uses one of accent libraries 124 to supplement a known speech recognition engine using a known type of linguistic library 122.

Figure 2:
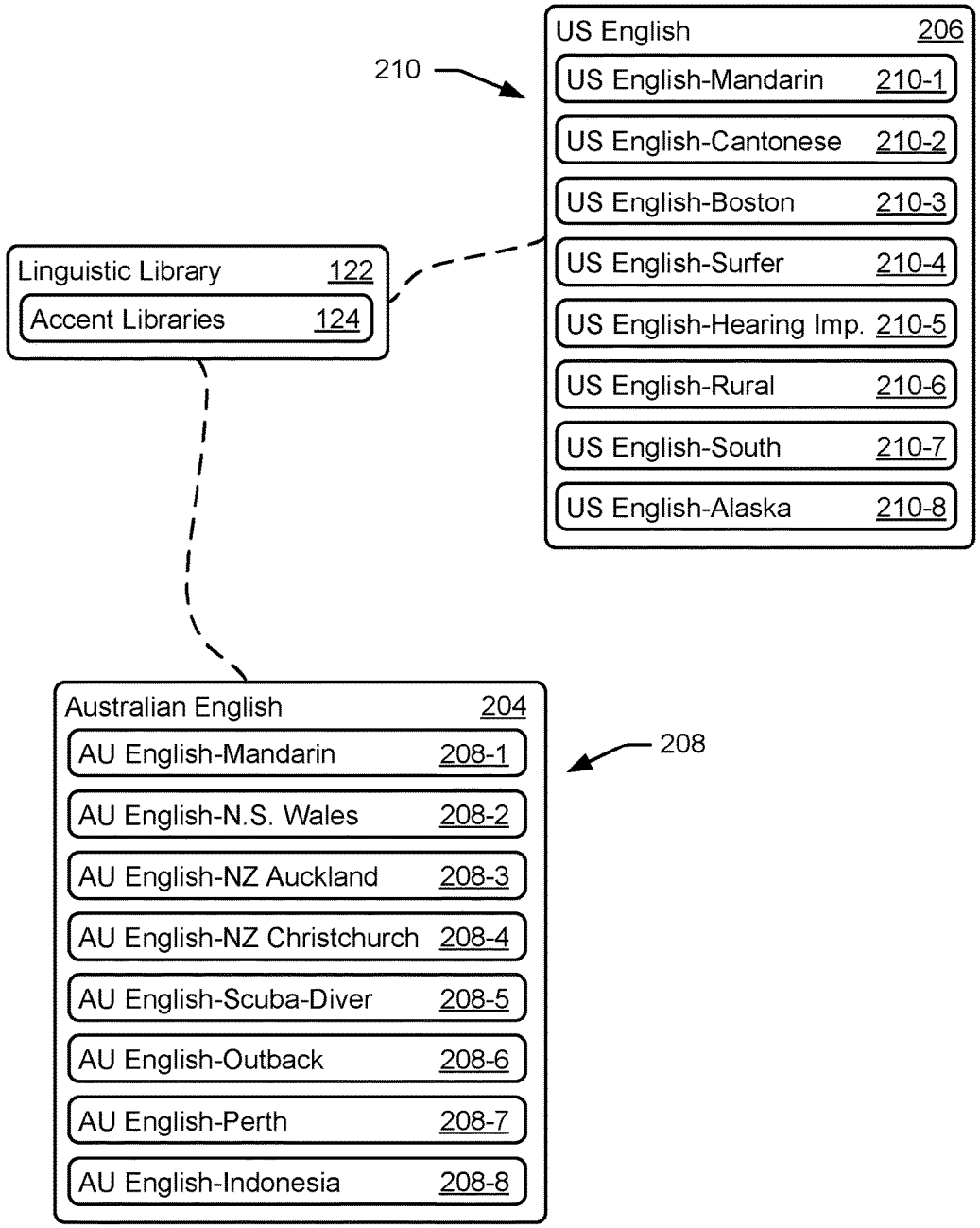
FIG. 2 illustrates example linguistic and accent libraries of FIG. 1.

By way of example, consider FIG. 2, which illustrates example linguistic libraries 122 and accent libraries 124 of FIG. 1. Here two example linguistic libraries, Australian English 204 and US English 206, are shown. Associated with each of these linguistic libraries 204 and 206, are numerous accent libraries 208 and 210, respectively.

Accent libraries 208 include eight examples, though many more are contemplated by the techniques, including Australian (AU) English-Mandarin 208-1, AU English-New South (N.S.) Wales 208-2, AU English-New Zealand (NZ) Auckland 208-3, AU English-NA Christchurch 208-4, AU English-Scuba-Diver 208-5, AU English-Outback 208-6, AU English-Perth 208-7, and AU English-Indonesia 208-8. As is clear from the names, each of these accent libraries is associated with a large language group (Australian English) and accents present within that language group, whether it be recent Mandarin-speaking immigrants or persons involved in scuba diving.

Similarly, accent libraries 210 include eight examples, US English-Mandarin 210-1, US English-Cantonese 210-2, US English-Boston 210-3, US English-Surfer 210-4, US English-Hearing Impaired 210-5, US English-Rural 210-6, US English-South 210-7, and US English-Alaska 210-8. Note that the Mandarin accent libraries 208-1 and 210-1 can be different, as each is associated with a different linguistic library. There may, however, be some common elements between the accent libraries due to common traits of Mandarin speakers, whether speaking English in an Australian dialect or a US dialect. Note that these accent libraries are nearly unlimited in number and in accents addressed. Regional accents, accents common to small or large immigrant groups, interests and subcultures, and even common physical characteristics, such as persons that are hearing impaired having some commonality in accent.

In the example of FIG. 2, each of accent libraries 124 contain supplemental information or algorithms for use by linguistic library 122. Here linguistic library 122 is used for a large language group (e.g., that has more, an average, or a median for a larger number of persons), which is supplemented by one or more of accent libraries 124. While this example of FIG. 2 associates accent libraries with linguistic libraries, accent module 114 may forgo use of a linguistic library or a known speech recognition engine. Accent module 114 may instead provide its own algorithms and engine without use of other engines or libraries, relying instead on accent library 124 without linguistic library 122 but including algorithms or information useful for recognizing speech of a large number of persons.

Accent module 114 may determine which of accent libraries 124 to use to recognize accented speech based on device data 116 and/or mined data 118 (both of FIG. 1). Device data 116 can include device personal data 126, as well as data specific to computing device 102. Data specific to computing device 102 can include the date of manufacture or purchase of computing device 102 (e.g., a recently-released mobile phone or tablet) and information about computing device 102, such a manufacturer, hardware capabilities, and so forth.

Device personal data 126 includes data created or determined based on a user's interaction with computing device 102, such as names of contacts, installed applications, receiving country or regions of messages, a user's name, contact information, non-standard keyboards (e.g., for a particular language other than the language for which computing device 102 is set), and contextual application information (e.g., search terms). Thus, names of contacts may indicate a country of origin of the user or a non-standard type of keyboard may indicate that a language other than the language setting for the computing device is the user's native language. Further, a receiving country or region for messages may include addresses in countries in which the language setting for the computing device is not a most-spoken language, e.g., the receiving country of Indonesia with a setting of Australian English, such as shown in FIG. 2 with Australian English 204 and AU English-Indonesia 208-8.

In more detail, emails or addresses in a user's contacts may indicate a nationality or ethnic origin of the user (e.g., Slavic first or last names). The addresses may indicate a native location of, or current location of, the user, as well as other details about the user that may be used to determine an accent library 124 for the user. Names in email address lines or text in those emails may indicate the user's friends' nationalities, origins, subcultures, or the user's business, or the user's interests. These interests, as noted further below, may indicate an accent, such as user's interest in surfing, scuba diving, or cooking. Some words and how these words are spoken can depend on these interests, and thus subcultures.

A person involved in scuba diving, for example, may use the terms "re-breather" and "Barotrauma," which, but for an accent library associated with scuba diving, might be incorrectly recognized. Similarly, a person involved in surfing might use the terms "goofy foot," "cutback," or "closed out," which might also be incorrectly recognized from a user's speech. Finally, for the cooking enthusiast, "La Creuset," "rotisserie," and "braising," may be incorrectly recognized without the current techniques.

Device personal data 126 may also include other information useful in determining an accent and thus an accent library, such as Slavic-language books in the user's e-book library, Slavic-language news articles, articles and books about Poland, a saved weather channel for Warsaw, Poland, information about fishing in Estonia, a web search entry for accordion music, polka music in the user's music library, and so forth.

Mined data 118 may also or instead be used by accent module 114 to determine which of accent libraries 124 to use to recognize speech. Mined data 118 includes mined personal data 128, which may include any personal data that may be found about a user of computing device 102, either through the Internet or otherwise. Thus, mined personal data 128 may include the user's search terms, purchases, location, demographics, income, and so forth.

As noted, computer-readable storage media 106 also includes applications 120, such as email application 130, social network application 132, or spreadsheet application 134 all of FIG. 1. Each of applications 120 includes one or more application fields 136, which, in some embodiments, are used to determine a speech recognition correction level. By way of example, consider spreadsheet application 134. Here a number-only cell 138 and a general-text cell 140 are each an example of application field 136. Number-only cell 138 may require more-precise text than general-text cell 140, and thus a different speech recognition correction level.

Figure 3:
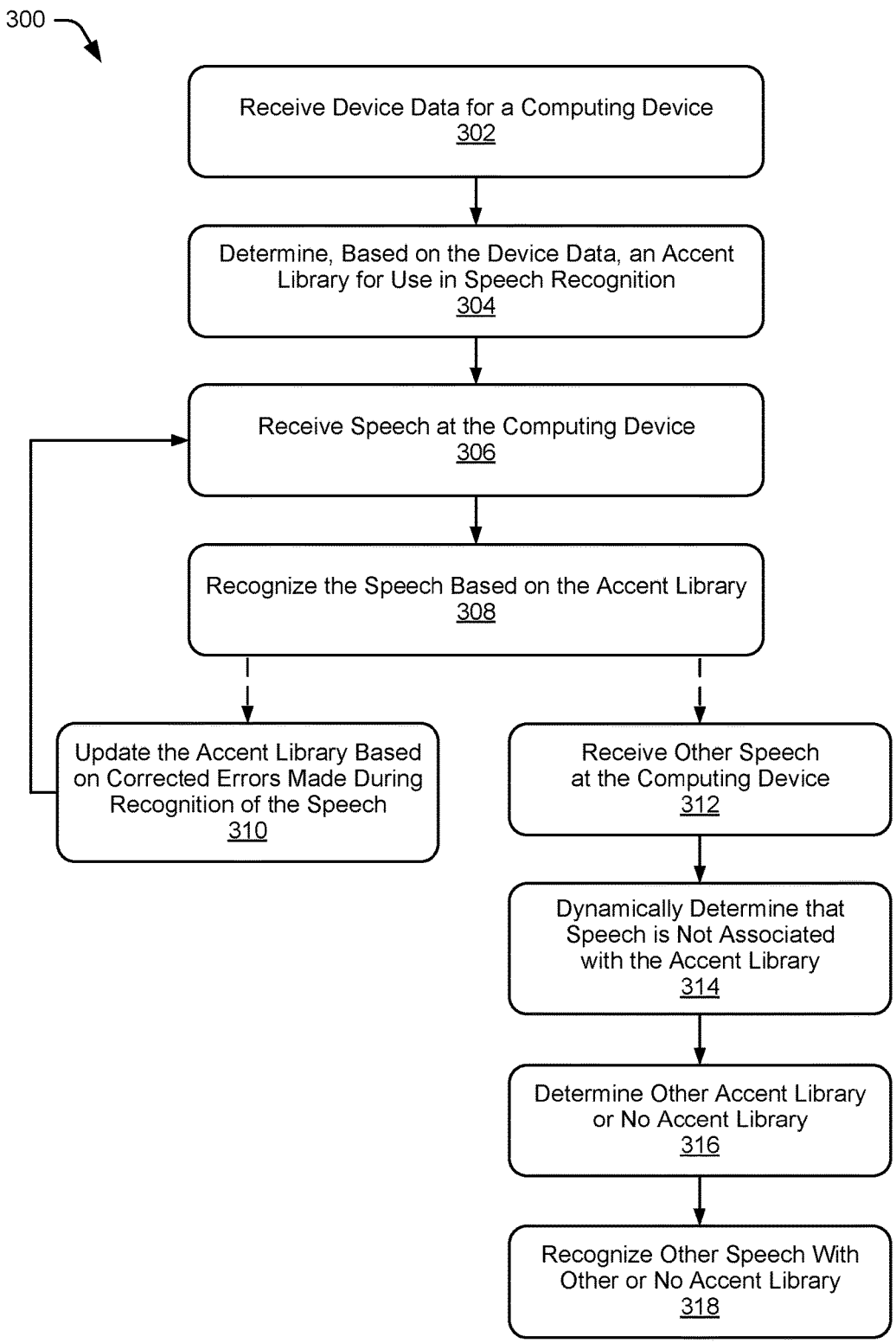
FIG. 3 illustrates example methods for recognizing accented speech using an accent library determined based on device data.

FIG. 3 illustrates example methods 300 for recognizing accented speech using an accent library determined based on device data. The order in which blocks of these and other methods are described is not intended to be construed as a limitation, and any number or combination of the described blocks in these and other methods herein can be combined in any order to implement a method or an alternate method.

At block 302, device data is received for a computing device. Device data can be received responsive to an active retrieval performed at block 302. Thus, using environment 100 of FIG. 1 as an example, accent module 114 may retrieve device data 116 at block 302, such as by searching contact data on computing device 102 and technological details about computing device 102.

As noted in part above, device data 116 may include device personal data 126 and other, non-personal data associated with computing device 102. By way of one ongoing example, assume that device data 116 indicates that computing device 102 is a smartphone released just 30 days ago that has significant computing power. This may be used in part to determine an appropriate accent library 124 based on demographics indicating that users of this smartphone, at least when recently released, are early adopters, technologically savvy, and aged between 18 and 32.

Assume that device personal data 126 includes contact names and addresses indicating a statistically relevant quantity of Asian last names and Asian first names. This statistical relevance can be determined in various manners, such as by comparison with a typical person's contact list that uses the same linguistic library 122. Thus, while the average number of Asian first names for an American (US) English linguistic library user's contact list may be 1.3% and Asian last names 11% assume here that this user's contact list has 14% Asian first names and 29% Asian last names. Statistical analysis considers this statistically relevant based on it being one or more standard deviations from average. This indicates a likelihood that the user may not be a native English speaker or that family members of the user are likely not to be a native English speaker, especially the statistically-relevant quantity of Asian first names, as Asian first names are more likely to indicate a first-generation immigrant than Asian last names.

In addition to this information from a user's contact list, assume that device personal data 126 indicates that the user's name is "Molly Chin," substantial numbers and durations of trips to the beach, a purchase of surfing gear, and that the user lives in southern California.

At block 304, an accent library is determined based on the device data received. This accent library is determined for use in speech recognition. Continuing the ongoing embodiment, assume that accent module 114 correlates device data 116 with known accents associated with this type of device data, thereby determining that two different accent libraries 124 are likely, that of US English-Mandarin 210-1 and US English-Surfer 210-4 both of FIG. 2. Assume that the surfer accent library is determined to be more likely based on the young age projected for the user (as an early adopter and so forth), trips to the beach, an English first name (Molly), surfer-based purchases, and so forth. In this ongoing example, accent module 114 determines accent libraries 124 based on device data 116, though accent module 114 may also or instead base this determination on mined data 118 and information about prior speech received by computing device 102.

At block 306, speech is received at the computing device. Speech can be received in various manners, such as input mechanism 110 described above. Continuing the ongoing example, assume that the user says the following for entry into a text message to a friend "Jean, is it closed out?"

At block 308, speech is recognized based on the accent library. Concluding the ongoing example, accent module 114 uses, along with a speech recognition engine, linguistic library US English 206 and accent library US English-Surfer 210-4 selected based on device data as noted above. Here assume that, absent the accent library, that a speech recognition engine would recognize Molly's speech of "Jean, is it closed out?" as "Jean, is it close now?" Due to accent library US English-Surfer 210-4, however, accent module 114 acts to correctly recognize Molly's speech as "Jean, is it closed out?" Accent module 114 then passes this text to the text field.

This recognition is due, in this example, to accent module 114 being able to select between multiple options for how to recognize Molly's speech, including an option that, but for the accent library, would have been considered a low-probability option for a current speech recognition engine relative to other likely options of "close now," "hosed out," and "closet." Here accent library US English-Surfer 210-4 adds words, changes probabilities of words and phrases, and alters algorithms to change how certain sounds are interpreted (e.g., surfers have a different speech pattern, which is part of an accent, not just the words used).

Alternatively or additionally, methods 300 proceed to blocks 310 and/or blocks 312-318. At block 310, the accent library is updated based on corrected errors made during recognition of the speech. Block 310 may work in conjunction with, or separate from, methods 400 as described below. In the above example methods 300 correctly recognized Molly's speech. Were it incorrect, correction by the user (Molly Chin) can be recorded and used to update the accent library.

At block 312, other speech is received at the computing device, the other speech received from a different speaker than the speech received at block 302. By way of example, assume that Molly passes her smart phone to her father because she is driving. Assume that Molly asks her father to request a good Thai restaurant. Assume also that her father is a native Mandarin speaker and that English is a second language for him. Further, assume that, like many native Mandarin speakers, Molly's father uses tones to differentiate words, while English speakers use intonation (pitch patterns in sentences). Further, assume that Molly's father, like many Mandarin speakers, has problems pronouncing "I" sounds at the end of a syllable. Thus, Molly's father pronounces "why" as "wiw," "fly" as "flew," and "pie" as "piw." Thus, when Molly's father asks the smart phone to find a Thai restaurant by saying "Find Thai Restaurant" but that, due to his accent, it sounds to a native US English speaker (or a speech recognition engine using only a US English library) as "Find Tew Restaurant."

At block 314, the other speech is dynamically determined not to be associated with the accent library determined at block 304. Accent module 114 determines, in real time on receiving the speech "Find Tew Restaurant" that the speaker is not Molly and thus that accent library US English-Surfer 210-4 does not apply. Accent module 114 may determine this based on the "Tew" or other indicators, such as tonal variances within the word "Restaurant," which is common to both Mandarin and Cantonese speakers, or simply that a history of speech received from Molly indicates that it is not Molly. This can be performed in numerous ways, such as Molly having a generally high-pitched voice and Molly's father not having this high pitch, speaking speed differences between Molly and Molly's father, and so forth.

At block 316, another accent library, or no accent library, is determined for the other speech. Continuing this example, assume that accent module 114 determines, based on tonal variances within the word "Restaurant" that Molly's father is either a native Mandarin or Cantonese speaker. Further, assume that accent module 114, determines that Molly's personal data indicates that she has friends and addresses associated more closely with a region of China in which Mandarin is the dominant language (e.g., Beijing) rather than regions associated with Cantonese (e.g., Hong Kong). This information may have already been determined at block 304 as noted above.

At block 318, the other speech is recognized with the other accent library or with no accent library, as determined above. Concluding the ongoing example, accent module 114 recognizes Molly's father's speech of "Find Tew Restaurant" as "Find Thai Restaurant" by using accent library US English-Mandarin 210-1 of FIG. 2 rather than incorrectly recognize this speech as "Find Two Restaurants."

FIG. 4 illustrates example methods 400 for altering an accent library to more-accurately recognize accented speech.

At block 402, a correction to a speech element is received. This correction corrects a speech element that was incorrectly recognized using an accent library. The correction can be received from a remote computing device, though this is not required. As noted in block 310, speech recognition using an accent library may be incorrect and then corrected by a user. One or many corrections associated with an accent library can be received, such as from thousands of remote computing devices (e.g., smart phones, laptops, tablets, desktops and so forth). The computing device can be computing device 102 of FIG. 1 but in this embodiment is a server computer remote from computing device 102 and at which corrections are recorded and accent libraries 124 are updated to improve recognition.

At block 404, an accent library is altered to provide an updated accent library, the updated accent library able to more-accurately recognize the speech element. Using one of the above examples to illustrate, assume that the accent library US English-Mandarin 210-1 incorrectly recognized Molly's father's speech as "Find The Restaurant" instead of "Find Thai Restaurant." Assume also that Molly's Father corrected the incorrect recognition to "Thai." This correction, and many others like it for the same accent library, can be sent to, and received by, an updating entity. The updating entity can be accent module 114 on computing device 102, or another accent module or other entity on a server computer.

At block 406, the updated accent library is provided to the remote computing device or devices effective to enable the remote computing device or devices to more-accurately recognize the speech element. Thus, the speech element "Tew" will be more likely to be correctly recognized as "Thai" than "The" using the updated accent library.

Furthermore, device data can also be received from the remote computing device or devices that is associated with a user of the remote computing device and based on which the accent library was determined to be used for speech recognition of speech from the user. Thus, information about Molly for corrections to accent library US English-Surfer 210-4 or Molly's father for accent library US English-Mandarin 210-1 can be provided.

The update to the appropriate accent library may then be tailored to certain device data or other data. This, in effect, may act to provide sub-categories of accent libraries over time. Thus, a speaker, such as a person having similarities to Molly Chin may receive an update for US English-Surfer 210-4 based on her similarities in age (18-30) and region (Southern California) that another speaker using US English-Surfer 210-4 will not, such as a man (aged 45-60) living in a different region (Miami, Fla.). In so doing, updates can be provided to users based on whether the users or their computing devices have one or more same elements of device or mined data as the device or mined data of the remote computing device from which the correction was received.

Figure 5:
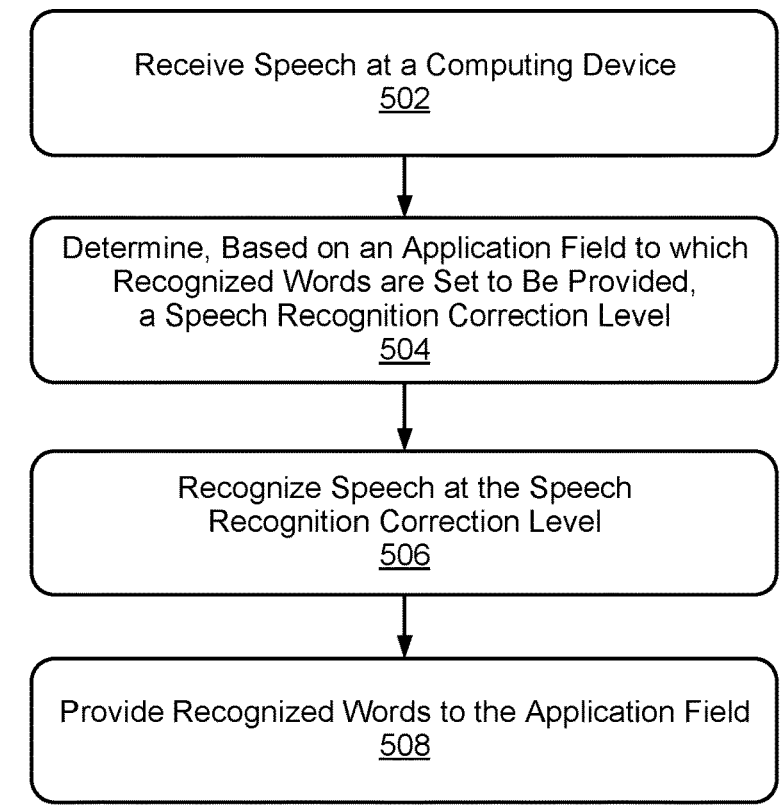
FIG. 5 illustrates example methods for recognizing speech at a speech recognition level based on an application field, which may use an accent library.

FIG. 5 illustrates example methods 500 for recognizing speech at a speech recognition level based on an application field, which may use an accent library.

At block 502, speech is received at a computing device. This can be as set forth in the various examples above.

At block 504, a speech recognition correction level is determined based on an application field to which recognized text are set to be provided. One example of this can be example application fields 136 of FIG. 1, namely number-only cell 138 and a general-text cell 140 of spreadsheet application 134. As noted above, accent module 114 may determine a speech recognition correction level based on the application fields, such as it likely needing highly accurate speech recognition or less accurate and/or faster recognition.

Figure 6:
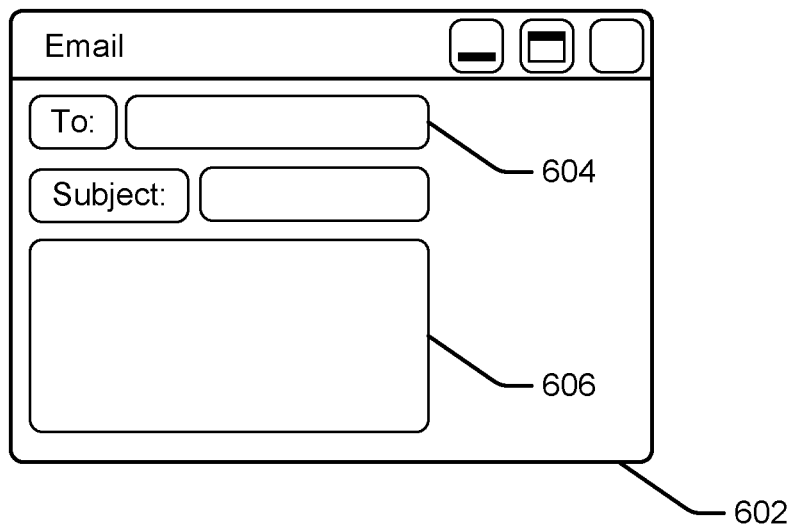
FIG. 6 illustrates an example application having application fields.

Consider, by way of example, FIG. 6, which illustrates an example email application's user interface 602 having application fields 604 and 606. Application field 604 is an address field and application field 606 is a body field. Assume for example that Molly Chin from the above examples says "Surf Girl Seven Seven Seven At Gee Mail Dot Com."

When opening a new email to send to a friend, assume that an email application will receive recognized text first into the email address field shown at application field 604. When speaking, and after the email address is complete, assume the email application will receive recognized text into the body of the email, at application field 606. In this example, accent module 114 determines that a maximum level of correction should be used for the address field. In such a case, accent module 114 uses an appropriate accent library 124 or makes other refinements that improve accuracy. Improving accuracy, however, can come at a cost in terms of time to recognize text and computing resources (processor and battery), to name but a few. Therefore, higher speech correction levels may not always be appropriate.

Note also that accent module 114 may apply different correction levels by determining to use none, one, or multiple accent libraries 114, such as both a Mandarin and a Surfer accent library, for example. Further, accent module 114 may determine correction levels without use, or lack of use, of accent libraries 124. For example, accent module 114 may use a different linguistic library 122 for some application fields or use an accent library 124 that is directed to spoken numbers rather than accents in normal speech. Thus, one of linguistic libraries 122 may be directed to recognizing speech that is numerical or for addresses and another that is directed to recognizing speech that is conversational. In these and other ways set forth herein, the techniques may act to improve speech recognition.

At block 506, the speech received is recognized at the speech recognition correction level to produce recognized text. Thus, for application field 604 (the email address field), accent module 114 recognizes speech at the determined speech recognition level, here at a maximum level using one or more accent libraries 124 and/or alternative linguistic libraries 122 directed to the expected speech.

At block 508, recognized words and other text are provided to the application field. Concluding the ongoing example for Molly Chin, at block 508 accent module 114 recognizes the speech of "Surf Girl Seven Seven Seven At Gee Mail Dot Com" not as words but, based on the accent library 124 and/or linguistic library 122, as a combination of words and text, and also because it is an address field for an email, the "at" as the "@" symbol. Thus, the speech is recognized as "surfgirl777@GMail.com".

While not required, the techniques, in some embodiments, use a less-than-maximum speech correction level when the application field is a body of an email, blog, social networking entry, or word-processing document. Conversely, the techniques, for address fields, number-only fields in spreadsheets, phone numbers, and so forth may use maximum speech correction levels and/or alternative linguistic libraries 122 or accent libraries 124.

Figure 7:
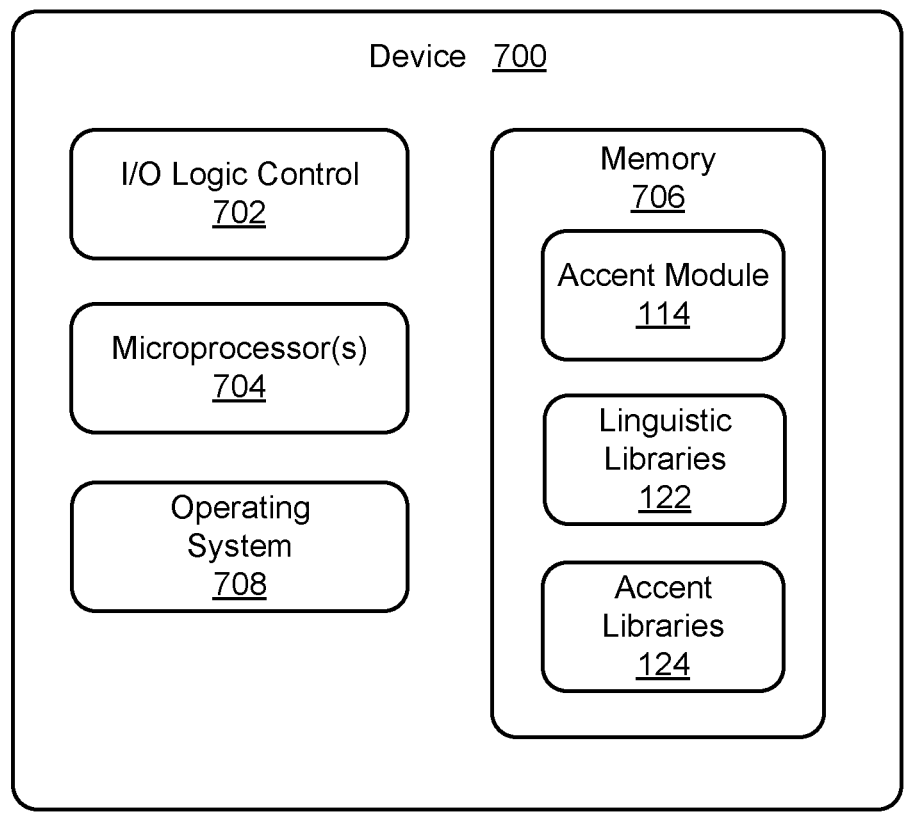
FIG. 7 illustrates various components of an example apparatus that can implement techniques for recognizing accented speech.

FIG. 7 illustrates various components of an example device 700 including accent module 114 including or having access to other modules, these components implemented in hardware, firmware, and/or software and as described with reference to any of the previous FIGS. 1-6.

Example device 700 can be implemented in a fixed or mobile device being one or a combination of a media device, computing device (e.g., computing device 102 of FIG. 1), television set-top box, video processing and/or rendering device, appliance device (e.g., a closed-and-sealed computing resource, such as some digital video recorders or global-positioning-satellite devices), gaming device, electronic device, vehicle, and/or workstation.

Example device 700 can be integrated with electronic circuitry, a microprocessor, memory, input-output (I/O) logic control, communication interfaces and components, other hardware, firmware, and/or software needed to run an entire device. Example device 700 can also include an integrated data bus (not shown) that couples the various components of the computing device for data communication between the components.

Example device 700 includes various components such as an input-output (I/O) logic control 702 (e.g., to include electronic circuitry) and microprocessor(s) 704 (e.g., microcontroller or digital signal processor). Example device 700 also includes a memory 706, which can be any type of random access memory (RAM), a low-latency nonvolatile memory (e.g., flash memory), read only memory (ROM), and/or other suitable electronic data storage. Memory 706 includes or has access to accent module 114, linguistic libraries 122, and accent libraries 124 and, in some embodiments, a speech recognition engine (not shown).

Example device 700 can also include various firmware and/or software, such as an operating system 708, which, along with other components, can be computer-executable instructions maintained by memory 706 and executed by microprocessor 704. Example device 700 can also include other various communication interfaces and components, wireless LAN (WLAN) or wireless PAN (WPAN) components, other hardware, firmware, and/or software.

Other examples capabilities and functions of these modules are described with reference to elements shown in FIGS. 1 and 2. These modules, either independently or in combination with other modules or entities, can be implemented as computer-executable instructions maintained by memory 706 and executed by microprocessor 704 to implement various embodiments and/or features described herein. Alternatively or additionally, any or all of these components can be implemented as hardware, firmware, fixed logic circuitry, or any combination thereof that is implemented in connection with the I/O logic control 702 and/or other signal processing and control circuits of example device 700. Furthermore, some of these components may act separate from device 700, such as when remote (e.g., cloud-based) libraries perform services for accent module 114.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
   receiving, by an automated speech recognition system that is configured to perform speech recognition on received audio data using a selected linguistic library and one or more selected accent libraries, audio data of an utterance that was spoken while focus is set on a field of a form;
   based at least on a field type associated with the field of the form, determining to select at least two accent libraries for the automated speech recognition system to use in combination with a linguistic library to perform speech recognition on the audio data of the utterance;
   based on determining to select at least two accent libraries for the automated speech recognition system to use in combination with the linguistic library to perform speech recognition on the audio data of the utterance, selecting, from among multiple accent libraries, a first accent library and a second, different accent library;
   obtaining a transcription of the utterance by performing speech recognition on the audio data of the utterance using the first accent library, the second, different accent library, and the linguistic library; and
   providing, for output to the field of the form, the transcription of the utterance.

2. The method of claim 1, wherein the first accent library and the second, different accent library are selected based on demographic data of the user.

3. The method of claim 2, wherein the demographic data of the user includes an age range, gender, native language, and a geographic location where the user is located.

4. The method of claim 2, the demographic data of the user is based on countries of addresses stored in an address book of a computing device that receives the utterance.

5. The method of claim 1, comprising:
   receiving by the automated speech recognition system, additional audio data of an additional utterance that was spoken while focus is set on a different field of the form;
   based at least on a field type associated with the different field of the form, determining to select at least three accent libraries for the automated speech recognition system to use in combination with the linguistic library to perform speech recognition on the additional audio data of the additional utterance;
   based on determining to select at least three accent libraries for the automated speech recognition system to use in combination with the linguistic library to perform speech recognition on the additional audio data of the additional utterance, selecting, from among the multiple accent libraries, the first accent library, the second, different accent library, and a third, different accent library;
   obtaining an additional transcription of the additional utterance by performing speech recognition on the additional audio data of the additional utterance using the first accent library, the second, different accent library, the third, different accent library, and the linguistic library; and
   providing, for output to the additional field of the form, the additional transcription of the additional utterance.

6. The method of claim 1, wherein:
   the form is an email form,
   the field is an email body field, a to field, a cc field, or a subject field, and
   the field type is a general text field or an address field.

7. The method of claim 1, wherein increasing a quantity of accent libraries used by the automated speech recognition system increases an accuracy level of speech recognition.

8. The method of claim 1, wherein:
   the linguistic library includes words of a language, and
   the first accent library and the second, different library each include phonemes for different pronunciations for the words of the language.

9. A system comprising:
   one or more computers and one or more storage devices storing instructions that are operable, when executed by the one or more computers, to cause the one or more computers to perform operations comprising:
      receiving, by an automated speech recognition system that is configured to perform speech recognition on received audio data using a selected linguistic library and one or more selected accent libraries, audio data of an utterance that was spoken while focus is set on a field of a form;
      based at least on a field type associated with the field of the form, determining to select at least two accent libraries for the automated speech recognition system to use in combination with a linguistic library to perform speech recognition on the audio data of the utterance;

based on determining to select at least two accent libraries for the automated speech recognition system to use in combination with the linguistic library to perform speech recognition on the audio data of the utterance, selecting, from among multiple accent libraries, a first accent library and a second, different accent library;

obtaining a transcription of the utterance by performing speech recognition on the audio data of the utterance using the first accent library, the second, different accent library, and the linguistic library; and providing, for output to the field of the form, the transcription of the utterance.

10. The system of claim 9, wherein the first accent library and the second, different accent library are selected based on demographic data of the user.

11. The system of claim 10, wherein the demographic data of the user includes an age range, gender, native language, and a geographic location where the user is located.

12. The system of claim 10, the demographic data of the user is based on countries of addresses stored in an address book of a computing device that receives the utterance.

13. The system of claim 9, wherein the operations further comprise:

receiving, by the automated speech recognition system, additional audio data of an additional utterance that was spoken while focus is set on a different field of the form;

based at least on a field type associated with the different field of the form, determining to select at least three accent libraries for the automated speech recognition system to use in combination with the linguistic library to perform speech recognition on the additional audio data of the additional utterance;

based on determining to select at least three accent libraries for the automated speech recognition system to use in combination with the linguistic library to perform speech recognition on the additional audio data of the additional utterance, selecting, from among the multiple accent libraries, the first accent library, the second, different accent library, and a third, different accent library;

obtaining an additional transcription of the additional utterance by performing speech recognition on the additional audio data of the additional utterance using the first accent library, the second, different accent library, the third, different accent library, and the linguistic library; and providing, for output to the additional field of the form, the additional transcription of the additional utterance.

14. The system of claim 9, wherein:
the form is an email form,
the field is an email body field, a to field, a cc field, or a subject field, and
the field type is a general text field or an address field.

15. The system of claim 9, wherein increasing a quantity of accent libraries used by the automated speech recognition system increases an accuracy level of speech recognition.

16. A non-transitory computer-readable medium storing software comprising instructions executable by one or more computers which, upon such execution, cause the one or more computers to perform operations comprising:

receiving, by an automated speech recognition system that is configured to perform speech recognition on received audio data using a selected linguistic library and one or more selected accent libraries, audio data of an utterance that was spoken while focus is set on a field of a form;

based at least on a field type associated with the field of the form, determining to select at least two accent libraries for the automated speech recognition system to use in combination with a linguistic library to perform speech recognition on the audio data of the utterance;

based on determining to select at least two accent libraries for the automated speech recognition system to use in combination with the linguistic library to perform speech recognition on the audio data of the utterance, selecting, from among multiple accent libraries, a first accent library and a second, different accent library;

obtaining a transcription of the utterance by performing speech recognition on the audio data of the utterance using the first accent library, the second, different accent library, and the linguistic library; and providing, for output to the field of the form, the transcription of the utterance.

17. The medium of claim 16, wherein the first accent library and the second, different accent library are selected based on demographic data of the user.

18. The medium of claim 17, the demographic data of the user is based on countries of addresses stored in an address book of a computing device that receives the utterance.

19. The medium of claim 16, wherein the operations further comprise:

receiving, by the automated speech recognition system, additional audio data of an additional utterance that was spoken while focus is set on a different field of the form;

based at least on a field type associated with the different field of the form, determining to select at least three accent libraries for the automated speech recognition system to use in combination with the linguistic library to perform speech recognition on the additional audio data of the additional utterance;

based on determining to select at least three accent libraries for the automated speech recognition system to use in combination with the linguistic library to perform speech recognition on the additional audio data of the additional utterance, selecting, from among the multiple accent libraries, the first accent library, the second, different accent library, and a third, different accent library;

obtaining an additional transcription of the additional utterance by performing speech recognition on the additional audio data of the additional utterance using the first accent library, the second, different accent library, the third, different accent library, and the linguistic library; and providing, for output to the additional field of the form, the additional transcription of the additional utterance.

20. The medium of claim 16, wherein:
the form is an email form,
the field is an email body field, a to field, a cc field, or a subject field, and
the field type is a general text field or an address field.

21. The medium of claim 16, wherein increasing a quantity of accent libraries used by the automated speech recognition system increases an accuracy level of speech recognition.

* * * * *